(12) United States Patent
Modena et al.

(10) Patent No.: US 8,331,368 B2
(45) Date of Patent: Dec. 11, 2012

(54) METHOD OF PROCESSING INFORMATION PACKETS AND TELECOMMUNICATION APPARATUS USING THE SAME

(75) Inventors: Marco Modena, Rovagnate (IT); Carlo Costantini, Casatenovo (IT); Gianluca Bobbo, Monza (IT)

(73) Assignee: Alcatel Lucent, Paris (FR)

( * ) Notice: Subject to any disclaimer, the term of this patent is extended or adjusted under 35 U.S.C. 154(b) by 600 days.

(21) Appl. No.: 11/488,061

(22) Filed: Jul. 18, 2006

(65) Prior Publication Data

US 2007/0086356 A1 Apr. 19, 2007

(30) Foreign Application Priority Data

Oct. 19, 2005 (EP) ..................................... 05292201

(51) Int. Cl.
*H04L 12/28* (2006.01)
(52) U.S. Cl. ....................................................... 370/392
(58) Field of Classification Search .................. 370/392, 370/428, 429; 711/216
See application file for complete search history.

(56) References Cited

U.S. PATENT DOCUMENTS

| | | | |
|---|---|---|---|
| 5,394,536 A * | 2/1995 | Coghlan et al. ................ | 714/14 |
| 6,078,963 A * | 6/2000 | Civanlar et al. ............... | 709/238 |
| 6,337,860 B1 | 1/2002 | Wicklund | |
| 6,751,225 B1 | 6/2004 | Chung | |
| 7,277,399 B1 * | 10/2007 | Hughes, Jr. ................... | 370/252 |
| 7,515,600 B1 * | 4/2009 | Savage et al. ................. | 370/426 |
| 2002/0167910 A1 * | 11/2002 | Gammenthaler, Jr. ........ | 370/252 |
| 2003/0236919 A1 * | 12/2003 | Johnson et al. ............... | 709/251 |
| 2004/0156362 A1 * | 8/2004 | Pathi et al. .................... | 370/389 |
| 2004/0249879 A1 * | 12/2004 | Beverly ......................... | 709/200 |
| 2005/0152335 A1 * | 7/2005 | Lodha et al. .................. | 370/351 |
| 2007/0086360 A1 * | 4/2007 | Berg ............................. | 370/254 |

* cited by examiner

*Primary Examiner* — Mark Rinehart
*Assistant Examiner* — Peter Cheng
(74) *Attorney, Agent, or Firm* — Carmen Patti Law Group, LLC

(57) ABSTRACT

A method of processing information packets is disclosed which is adapted for a telecommunication apparatus comprising first processing means, second processing means and memory means. This method comprises the steps of:
A) receiving an information packet from a telecommunication network by means of the first processing means;
B) checking whether the value of a predetermined characteristic of this packet has already been processed by the second processing means;
C) if the check at step B) is negative, checking whether this value has already been stored into the memory means; and
D) if the check at step C) is negative, transmitting this value from the first processing means to the memory means and storing this value into the memory means.
This method can advantageously be used in a telecommunication apparatus, particularly a layer-2 switch machine.

18 Claims, 1 Drawing Sheet

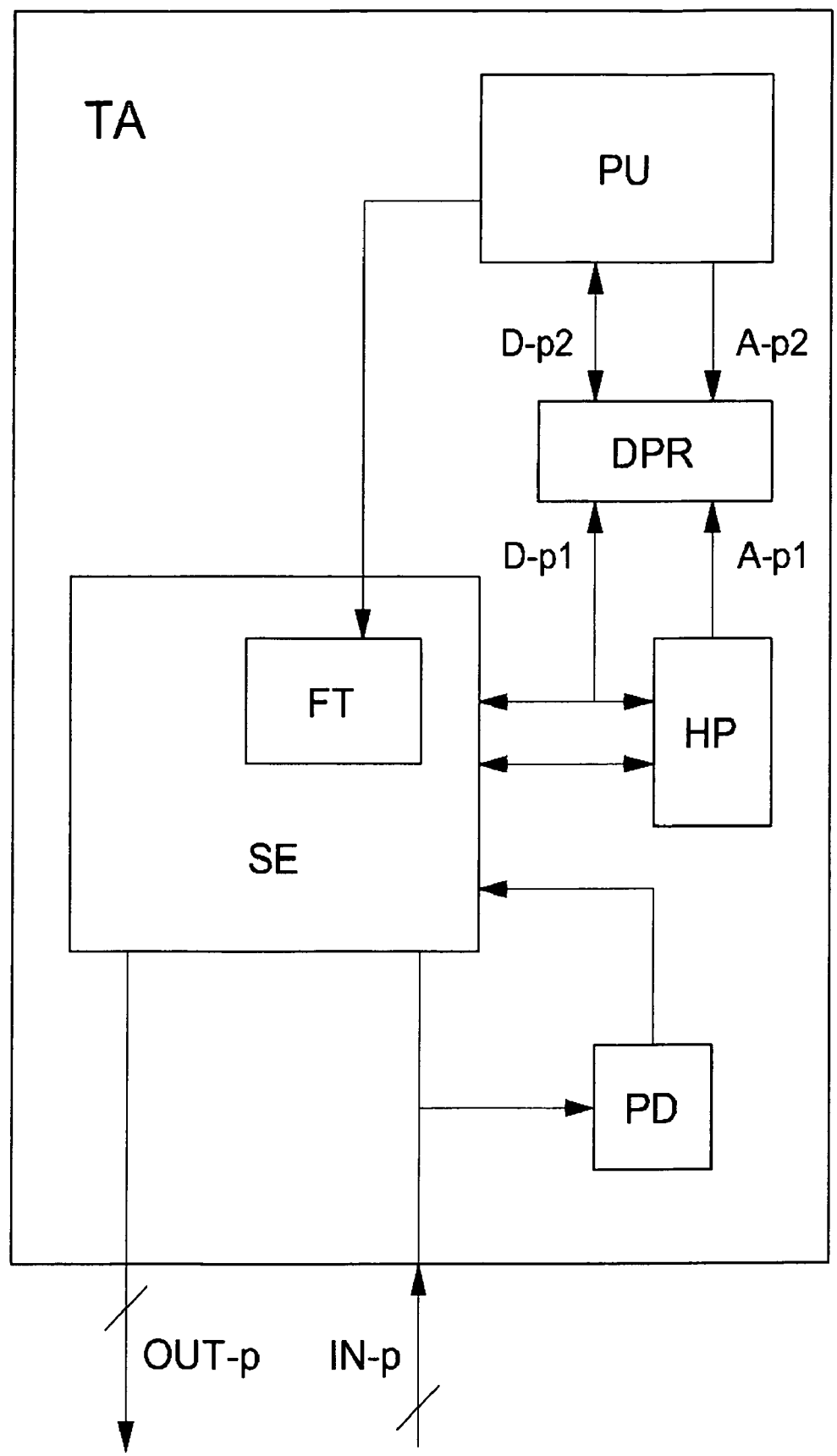

METHOD OF PROCESSING INFORMATION PACKETS AND TELECOMMUNICATION APPARATUS USING THE SAME

FIELD OF THE INVENTION

The present invention relates to a method of processing information packets according to the preamble of claim 1 and relates further to a telecommunication apparatus using the same.

This application is based on and claims the benefit of European Patent Application No 05292201.0 filed on Oct. 19, 2005, which is incorporated by reference herein.

BACKGROUND OF THE INVENTION

Usually, in a telecommunication apparatus, information packets are received, processed and transmitted; to this purpose, a data plane and a control plane are provided. The data plane takes care of physically handling (e.g. receiving, transferring, transmitting) the information packets and therefore it must be adapted to operate at high speed. The control plane takes care of controlling the data plane and of processing information packets so that the data plane carries out a correct handling of the packets; therefore, it is adapted to operate at low speed. The data plane and the control plane communicate between each other; in some cases, the data plane needs to internally transmit received information packets or their headers or part of their headers to the control plane.

This is the case of e.g. an ISO [International Organization for Standardization] layer-2 switch machine (i.e. that carries out "packet switching") wherein such internal transmission is necessary for updating its forwarding table. This type of telecommunication apparatus selects the next hop, i.e. where to route a packet or in other terms which output port to use for (externally) transmitting a packet, on the basis of the packet destination MAC [Media Access Control] address. The apparatus learns how to carry out such selection from incoming packets and more precisely from the source MAC address of the incoming packets; for example, if a packet with source MAC address "AAA" is received by the apparatus at port "K" then all packets with destination MAC address "AAA" will be routed to port "K"; such association is stored in a forwarding table.

Every time a packet is received by the apparatus with a source MAC address unknown to the forwarding table, the header of the packet is transmitted from the data plane to the control plane in order to update the forwarding table. According to prior art solutions, this transmission is carried out through a FIFO [First In First Out] memory.

If a plurality of packets are successively received with the same source MAC address unknown to the forwarding table, their packet headers will be successively stored into the FIFO memory until the processing unit of the control plane updates the forwarding table. This means that, much likely, a lot of identical information will be transmitted from the data plane to the control plane through the FIFO memory leading to a waste of storage capacity for the FIFO memory and to a waste of processing capacity for the processing unit of the control plane and to a waste of bus capacity between the data plane and the control plane; additionally, when the FIFO memory is full, packet headers can not be stored into the FIFO memory any longer and there is the risk that information packets are not processed by the processing unit.

SUMMARY OF THE INVENTION

It is the general object of the present invention to overcome the drawbacks of the prior art and to solve some of the communication problems between the data plane and the control plane in a telecommunication apparatus.

It is a more specific object of the present invention to provide an effective and efficient method and architecture for updating the forwarding table of a layer-2 switch machine.

These objects are substantially achieved through the processing method having the functionalities set out in the annexed claims.

The basic idea behind the present invention is to avoid transmitting the same information more than once. Advantageously, this can be carried out by checking whether a piece of information has already been stored into transfer memory means but not yet processed.

Such processing method may typically be used in a telecommunication apparatus; in fact, this is a further aspect of the present invention.

BRIEF DESCRIPTION OF THE DRAWINGS

The present invention, together with its advantages, will become more apparent from the following description to be considered in conjunction with the annexed drawing.

FIG. 1 shows a much simplified and partial block diagram of a telecommunication apparatus according to the present invention.

BEST MODE FOR CARRYING OUT THE INVENTION

The following description and the annexed drawing are given for explanation purposes only and therefore are not to be interpreted limitatively.

In FIG. 1, a telecommunication apparatus, in particular a layer-2 switch machine, is shown and globally referred to as TA. Incoming information packets are received by apparatus TA at a plurality of input ports IN-p and outgoing information packets are transmitted by apparatus TA from a plurality of output ports OUT-p.

Incoming packets are provided to a switching engine SE; additionally, incoming packets are provided to a protocol decoder PD; a protocol decoder might even be a component of a switching engine.

Switching engines are well known to the persons skilled in the art and comprise a lot of components (not shown in FIG. 1) also well known to the persons skilled in the art; for the purpose of the present invention, it is sufficient to clarify that switching engine SE carries out its function using an internal forwarding table FT. Switching engine SE in combination with protocol decoder PD carries out data plane functions and can be considered high-speed processing means.

A processing unit PU is comprised in apparatus TA for carrying out control plane functions; unit PU is microprocessor-based, as it is common; unit PU can be considered low-speed processing means. One of the functions of unit PU is to update forwarding table FT. In order to do that, unit PU needs to receive information about the incoming packets. In the embodiment of FIG. 1, such information is transmitted to unit PU by switching engine SE through an appropriate circuitry. All the above is known to the person skilled in the art and, therefore, no further details will be provided in the present description.

According to prior art solutions, the above mentioned transmission is carried out through memory means in the form of a FIFO memory, i.e. a sequential access memory. To this regard, the solution shown in FIG. 1 is different from the prior art solutions; in fact, a dual port RAM memory DPR, i.e. a random access memory, is used. A dual port memory is a memory that can be read and written at the same time by two different entities connected to its two different ports.

Memory DPR has a first port p1 connected to switching engine SE and a second port p2 connected to unit PU; letter "A" refers to the address lines of the port and letter "D" refers to the data lines of the port. In the embodiment of FIG. 1, memory DPR is made of 256 word locations, the word being 56-bit long.

Additionally, a hash processor HP is comprised in the embodiment of FIG. 1; this is used for generating addresses when switching engine SE needs to write data into memory DPR or to read data from memory DPR.

Before further describing the present invention, it is deemed useful to briefly mention the concept of "hashing" that will be referred to in the following. For a better understanding of this concept, reference may be made to "The Art of Computer Programming—Sorting and Searching" by Donald E. Knuth, Vol. 3, Second Edition, Par. 6.4. "Hashing" means the transformation of a character string, called key, into another character string having a length fixed and generally shorter than the original one. Hashing is often used for indexing and retrieving objects in a database since, of course, it is easier to find an object by using a shorter transformed key than finding it by using the original key. The hashing algorithm is called "hash function". A valuable hash function should not produce the same hash value starting from two different data; when this happens, it is said that a "collision" has occurred. A hash function providing a low collision risk is usually considered acceptable.

The method according to the present invention is used in a telecommunication apparatus, such as apparatus TA, comprising first processing means (typically high-speed processing means), such as block SE, second processing means (typically low-speed processing means), such as unit PU, and memory means, such as memory DPR; the first processing means are adapted to receive and transmit information packets to and from telecommunication networks; the memory means are adapted (preferably dedicated) to store data transmitted from the first processing means to the memory means and will be referred to in the following as transfer memory means.

In general, the method of the present invention comprises the steps of:
A) receiving an information packet from a telecommunication network by means of the first processing means,
B) checking whether the value of a predetermined characteristic of this packet has already been processed by the second processing means,
C) if the check at step B) is negative, checking whether this value has already been stored into memory means, and
D) if the check at step C) is negative, transmitting at least this value from the first processing means to the memory means and storing this value into the memory means.

It is clear that through this method, any value of a characteristic of a received information packet will be transmitted from the first processing means to the memory means (and afterwards, from the memory means to the second processing means) only once; in this way, the first processing means can have a low processing capacity and the transfer memory means can have a low storage capacity; additionally, there is a low risk that information packets are not processed by the second processing means.

The characteristic of the information packet to be processed by the second processing means vary according to the application; typically this characteristic is the whole packet header or a part thereof. The information packet can be e.g. an IP packet, MAC packet, etc. The characteristic of the information packet can be e.g. the source address, the destination address, or a combination thereof. An IP address (IPv4 format) is made of 32 bits while a MAC address is made of 48 bits. The characteristic can be transmitted in coded (e.g. encrypted) format or in plain, i.e. not coded, format or in reference format (i.e. location where the characteristic value is stored and can be found).

For updating the forwarding table of a layer-2 switch machine, the characteristic comprises essentially the source MAC address of the received packet.

Anyway, in order to update the forwarding table, FT in the embodiment of FIG. 1, the processing unit of the control plane, i.e. unit PU in the embodiment of FIG. 1, needs to know the port of the apparatus at which the packet was received. The best possibility is to consider also the reception port address as part of the characteristic of the packet to be transmitted to the processing unit of the control plane; in this case, for every information packet "unknown" to the forwarding table, both its source MAC address (48 bits) and its reception port address (e.g. 7 bits) is written into the transfer memory means in an appropriate memory location. Alternatively, the transfer memory means may provide at least a memory location for each port of the apparatus. When an information packet "unknown" to the forwarding table is received, its source MAC address is written into the transfer memory means in the memory location corresponding to its reception port; in this way, the reception port address is transmitted in an indirect way. As many packets are received from every port, it might be necessary to provide a set (e.g. two or three or four) of memory locations for each port of the apparatus in order to be able to face situations when many "unknown" packets from the same port are received in a short time.

In a telecommunication apparatus comprising a forwarding table, like apparatus TA of FIG. 1, the check at step B) of the above defined method can be carried out by checking data stored in the forwarding table. In the embodiment of FIG. 1, switching engine SE checks whether the source MAC address of each received packet is stored in table FT. Table FT is advantageously realized through a TCAM [Ternary Content Addressable Memory]. Unlike standard computer memory, e.g. RAM, in which the user supplies a memory address and the memory returns the data word stored at that address, a CAM is designed such that the user supplies a data word and the CAM searches to see if that data word is stored anywhere in it. If the data word is found, the CAM typically returns the memory address where the data word was found; in some architectures, it also returns the data word or other associated pieces of data.

The check at step C) of the above defined method can be carried out by checking data stored in the transfer memory means. Typically, this can be carried out by reading data from the transfer memory means. This is the case of the embodiment of FIG. 1, where switching engine SE checks whether the source MAC address of a received packet that is not yet stored in table FT is stored in memory DPR; to this purpose, switching engine SE reads data from memory DPR.

The storing at step D) of the above defined method can be carried out by storing into the transfer memory means at least the value of the characteristic of the packet at a memory address generated through a hash function. This is the case of the embodiment of FIG. 1, where switching engine SE provides the MAC address to be written into memory DPR both to memory DPR, more specifically to data lines D-p1 of its port p1, and to the hash processor HP. Hash processor HP generates a hash value of the MAC address and provides the hash value to memory DPR, more specifically to address lines A-p1 of its port p1. Then a "write" operation is requested by switching engine SE to memory DPR. In a way, memory DPR has a different word location for each MAC address that can reasonably be processed by apparatus TA. This is not completely true, as "collisions" are possible and therefore the same hash value may correspond to two different MAC addresses; anyway, this happens with a low probability if the hash function is well selected.

If a hash function is used for storing information packet characteristics into the transfer memory, the same hash function may advantageously be used for carrying out the check at step C) of the above defined method. This is the case of the embodiment of FIG. 1, when switching engine SE needs to check whether a MAC address is already stored in memory DPR, it provides this MAC address to the hash processor HP. Hash processor HP generates a hash value of the MAC address and provides the hash value to memory DPR, more specifically to address lines A-p1 of its port p1. Then a "read" operation is requested by switching engine SE to memory DPR. The hash function may be realized through a hash table, as in the embodiment of FIG. 1; in this way, the hash function does not require computation.

The second processing means receives the values of characteristic of the packets by reading the transfer memory means. In the embodiment of FIG. 1, processing unit PU reads memory DPR by sending addresses to port p2 of memory DPR, more specifically to its address lines A-p2, and receiving data from port p2 of memory DPR, more specifically its data lines D-p2. According to a first possibility, unit PU reads only one memory word, containing e.g. a MAC address and a port address, at a time and then processes the read information, e.g. updates forwarding table FT. According to a second possibility, unit PU reads all the words in the transfer memory means, i.e. the whole transfer memory means, and then processes a word at a time. Such global reading is carried out cyclically and preferably periodically. If a periodical reading is chosen, it is possible to precisely control e.g. the updating of the forwarding table.

Once a memory word has been read and processed by unit PU, it is useful that it would no be read and processed a second time. The best (and easy) way to assure this result, is to provide for each memory word location a flag, e.g. one additional bit, that signals whether the information contained in the word is valid (i.e. not yet read and processed by unit PU) or invalid (already read and processed by unit PU). According to this best way, the first processing means, switching engine SE in the embodiment of FIG. 1, needs to store also this flag, suitably set, when storing a characteristic into the transfer memory means, and the second processing means, unit PU in the embodiment of FIG. 1, needs to reset this flag after reading and processing a characteristic from the transfer memory means. Therefore, the second processing means carry out a write operation on the transfer memory means (appropriately) after having carried out a read operation on the transfer memory means. If reading is done "word by word", resetting is done appropriately afterwards "word by word"; if reading is done "contemporaneously" (to be precise, one word immediately after the other), resetting may be done appropriately afterwards "contemporaneously". In some kind of memory means, it might be possible to write and erase their memory locations instead of setting and resetting flags.

The above described method can usefully be used in a telecommunication apparatus, like apparatus TA of FIG. 1, for processing information packets. The telecommunication apparatus comprises first processing means, second processing means and memory means. The first processing means are adapted to receive/transmit information packets from/to a telecommunication network and are adapted to check whether a value of a predetermined characteristic of a received information packet has already been processed by the second processing means. The memory means are adapted to store data transmitted from the first processing means to the memory means. The first processing means are further adapted to check whether the value has already been stored into the memory means, the check being performed if the value has not already been processed by the second processing means; the first processing means are further adapted to transmit the value from the first processing means to the memory means and to store the value into the memory means, the transmission and the storing being performed if the value has not already been stored into the memory means.

The first processing means are adapted to check whether the value has already been processed by checking if the value is stored in a forwarding table.

The telecommunication apparatus further comprises an hash processor connected to the memory means and to the first processing means and adapted to generate addresses for the memory means, wherein the first processing means are further adapted to check if the value has already been stored into the memory means by reading into the memory means using the generated addresses.

The method can be implemented in a particularly effective and efficient way if the transfer memory means is realized through a dual port RAM device, due to its two access ports: one of them can used by transmitting entity and the other of them can used by the receiving entity.

If the telecommunication apparatus comprises a forwarding table, the method can be used for updating said table; this is particularly the case of a telecommunication apparatus adapted to carry out layer-2 packet switching.

The invention claimed is:

1. Method of processing information packets in a telecommunication apparatus wherein the telecommunication apparatus comprises a layer-2 switch machine comprising first processing means having a forwarding table and residing in the data plane, second processing means residing in the control plane, and dual port memory means operatively coupled to the first and second processing means, said first processing means receiving and transmitting information packets by using the forwarding table, said dual port memory means being adapted to store data transmitted from said first processing means to said dual port memory means, and said second processing means being adapted to read data from said dual port memory means so as to update the forwarding table, comprising the steps of:
   A) receiving an information data packet at the first processing means from a telecommunication network;
   B) checking whether a predetermined value of said information packet has already been processed by said second processing means by determining if the predetermined value is already stored in the forwarding table;
   C) if the check at step B) is negative, the first processing means addresses a first port of said dual port memory means using addresses generated through a hash function to determine whether the first processing means has already written said predetermined value into said dual port memory means in response to receiving a previous information data packet, wherein the dual port memory means is a non-FIFO dual port RAM memory;
   D) if the determination of step C) is negative, the first processing means writes at least said predetermined value into said dual port memory means using the first port; and
   E) updating the forwarding table based on said predetermined value where the second processing means reads said predetermined value from a second port of the dual port memory means and updates the forwarding table based on said predetermined value;

wherein said first processing means, upon determining that the predetermined value is not located in said forwarding table, checks said dual port memory for said predetermined value and stores the predetermined value in said memory only if the predetermined value is not already stored in said memory.

2. Method according to claim 1, wherein said predetermined value comprises the source address of said packet.

3. Method according to claim 2, wherein said telecommunication apparatus comprises a plurality of ports for receiving information packets, said packet having been received at a port of said plurality of ports, and wherein said predetermined value further comprises the port address of said port;

wherein the telecommunication apparatus is a layer 2 switch wherein the predetermined characteristic comprises a layer 2 address and wherein the layer 2 switch switches frames based on layer 2 address information.

4. The method of claim 3 wherein updating the forwarding table based on said predetermined value further comprises updating the forwarding table with the port address and the source address where the source address comprises a MAC address.

5. The method of claim 4 wherein the first processing means receives a predetermined value associated with a received information data packet in a first instance and a duplicate predetermined value in a second instance, and the first processing means writes the predetermined value to the memory means only once.

6. The method of claim 5 wherein the forwarding table is updated with the duplicate value only once.

7. The method of claim 6 wherein the first processing means resides in a data plane and the second processing means resides in a control plane wherein the first processing means operates only in the data plane and the second processing means operates only in the control plane.

8. Method according to claim 1, the address generated through a hash function is generated by a hash of a MAC address.

9. Method according to claim 1, wherein the storing at step D) is carried out by storing into said dual port memory means at least said value at a memory address generated through a hash function.

10. Method according to claim 1, wherein step E) further comprises said second processing means reading said predetermined value from said second port of said memory means and afterwards marking said predetermined value in said dual port memory means as read and processed.

11. Method according to claim 10, wherein said second processing means reads all data in said dual port memory means, in particular cyclically and preferably periodically, and afterwards marks all data in said memory means as read and processed.

12. A layer-2 switch machine in a telecommunication apparatus, comprising:

first processing means that resides in a data plane and receives/transmits information packets from/to a telecommunication network, said first processing means, in response to the receipt of an information packet, checking a forwarding table, also located in said data plane, for a predetermined value associated with said received information packet so as to forward said received information packet;

second processing means that resides in a control plane and regularly processes the predetermined values associated with the received information packets to update the forwarding table when the predetermined values are not already stored in the forwarding table; and dual port memory means, operatively coupled between the first and second processing means, for storing said predetermined value associated with said received information packets when written by said first processing means using a first port and outputting said predetermined value associated with received information packets when read by said second processing means using a second port;

wherein said first processing means, upon determining that the predetermined value is not located in said forwarding table, checks said dual port memory means using said first port using addresses generated through a hash function for said predetermined value and stores the predetermined value in said memory only if the predetermined value is not already stored in said memory.

13. Telecommunication apparatus according to claim 12, further comprising a hash processor connected to said dual port memory means and to said first processing means, said hash processor generating addresses for said dual port memory means and said first processing means checking if said value has already been stored into said dual port memory means by reading said dual port memory means using the generated addresses, wherein the dual port memory means is a non FIFO dual port RAM memory.

14. The apparatus of claim 12 wherein the first processing means receives a predetermined value associated with a received information packet in a first instance and a duplicate predetermined value in a second instance, and the first processing means writes the predetermined value to the memory means once.

15. The apparatus of claim 12 wherein the second possessing means reads said dual port memory means and marks said value in said memory means as read and processed.

16. The apparatus of claim 15 wherein said value further comprises a port address and source MAC address.

17. The apparatus of claim 16 wherein said second processing means updates a forwarding table with the port address and the source MAC address read from said dual port memory means.

18. The apparatus of claim 17 wherein the forwarding table is updated with the duplicate value once and wherein the first processing means operates only in the data plane and the second processing means operates only in the control plane.

* * * * *